A. MONNIER.
Manufacture of Metallic Zinc.
No. 1,453. Reissued April 14, 1863.
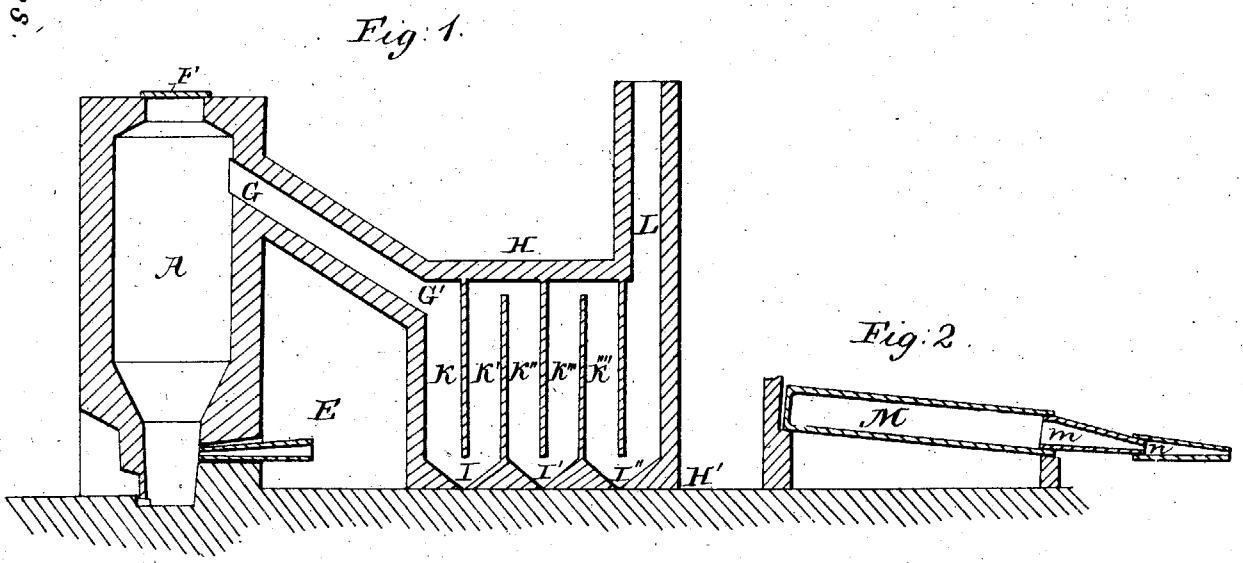
Witnesses.
J. H. B. Jenkins
George Harding
Inventor.
Alfred Monnier

UNITED STATES PATENT OFFICE.

ALFRED MONNIER, OF PHILADELPHIA, PENNSYLVANIA.

IMPROVEMENT IN THE MANUFACTURE OF METALLIC ZINC.

Specification forming part of Letters Patent No. 20,291, dated May 18, 1858; Reissue No. 1,453, dated April 14, 1863.

*To all whom it may concern:*

Be it known that I, ALFRED MONNIER, now of the city of Philadelphia, in the county of Philadelphia and State of Pennsylvania, formerly of the city of Camden, in the State of New Jersey, have invented a new and useful Improvement in the Manufacture of Metallic Zinc; and I do hereby declare that the following is a full, clear, and exact description of the same, reference being had to the accompanying drawings, forming part of this specification, in which—

Figure 1 represents a vertical section of an apparatus for carrying on the first portion of my process, and Fig. 2 represents a vertical section of an apparatus for finishing the process.

Heretofore in the manufacture of zinc from the native or impure ores it has been always customary to manufacture metallic zinc in a single process by heating the ore and carbon mixed together in a muffle or retort, the ore having undergone no treatment preliminary to being mixed with carbon and placed in the muffle or retort, except merely the application of the low degree of heat necessary for driving off water, carbonic acid, or sulphur. The gangue or earthy impurities remain with the ore, united with the zinc, and when that ore was placed in the muffle or retort with carbon it was necessary, in order to reduce it and obtain metallic zinc, to apply to the mixture a high degree of heat, and maintain such heat for a considerable length of time, in order to reduce the zinc disseminated through the mass of gangue. It was also necessary to crush the ore very fine before it was introduced into the muffle or retort. This high degree of heat and its long continuance destroys the mufflers or retorts, besides consuming a large amount of fuel.

My improvement consists in obtaining metallic zinc by a combination of two metallurgic operations—viz., first separating the oxides of zinc from the rest of the ore by applying to the ore, in a suitable furnace, a degree of heat such as would separate the oxide of zinc, or a large portion of it, by volatilization, from the gangue or other metals contained in the ore, or by treating the ore with heat in connection with lime or other flux, the more effectually to remove the gangue and other metals from the oxide of zinc; and, second, treating the oxide of zinc so obtained by heat and carbon in a suitable retort or muffle, and thereby obtaining therefrom metallic zinc.

The apparatus required to carry out the first-mentioned operation will consist of a furnace in which the ore is subjected to the necessary heat to effect the separation of the oxides and other volatile matters, and cause them to pass off from the gangue, and a condensing apparatus connected with such furnace to collect such matters, such apparatus resembling in its general character that which has been heretofore used in the manufacture of oxide of zinc for other purposes, but being capable of many variations and modifications. The second operation may be performed in muffles or retorts similar to those which have been heretofore used in the manufacture of metallic zinc direct from the ore.

The furnace A (represented in Fig. 1) resembles a common blast-furnace, having a solid hearth, a tuyere at E, and a movable cap, F, at the top for introducing the charges; and the condenser consists of a chamber, H H′, which has its bottom formed with a series of troughs, and also has a series of partitions, K $K^{I}$ $K^{II}$ $K^{III}$ $K^{I2}$, which extend alternately from the top to within a short distance of the bottom, and from the bottom to within a short distance of the top. The said chamber being connected at one end with the upper part of the furnace by a descending tube, G G′, and having at the other end a chimney, L. The ore in its native state, or after it has been roasted or dried to remove the water, carbonic acid or sulphur, is put into the furnace with a suitable quantity of fuel through the opening under the movable cap F, and the blast is applied through the tuyere to develop heat enough to cause the oxide of zinc in an impure state, mixed with pure oxide, to pass off from the gangue. The oxides and other volatile matters evolved pass to the top of the furnace, and are then conducted by the tube G G′ into the chamber H H′, wherein they are caused by the partitions to pursue a tortuous course, and the oxides are thus caused to deposit in the troughs at the bottom of the said chamber, whence they can be afterward collected and removed through openings I I′ I″ in the sides, and the refuse gaseous products finally escape through the chimney L. I prefer, however, in all cases to introduce, in the first instance, into the blast-furnace along with the ore and coal, lime or other flux in proportion varying according to the quantity of silica or other earthy material or metals contained in the ore. This flux unites with the slag, removes the gangue and other metals contained in the ore, and greatly facilitates the separation of the oxide of zinc from the gangue.

After having collected the oxide of zinc and other matters evolved from the blast furnace at the apertures I I′ I″, I place them in the close muffle or retort M, Fig. 2, with carbon in the proportion, by weight, of about one of carbon and two of the oxide of zinc. Heat is applied by a furnace below the retort in the ordinary manner. The retort terminates in a conical receiver, *m*, and a smaller receiver, *n*, from which the metallic zinc is removed in the ordinary manner.

The advantages of obtaining the metallic zinc by the two operations as above described is that the gangue or other metals contained in the ore being removed in the first instance in the blast furnace, the heat required in the muffle for the reduction of the oxide, when separated, is much less, and the durability of the muffle is greatly increased over the old process, and, besides, it admits of the production of metallic zinc from ores containing other metals, (as in case of the franklinite of New Jersey,) which cannot be treated by the ordinary process of making metallic zinc.

When I use the term "carbon," I mean either charcoal, anthracite, or bituminous coal, either of which will answer.

I do not confine myself to any particular form of apparatus to separate and obtain the oxide of zinc from the gangue and the other metals contained in the ore; but

What I claim as my invention, and desire to secure by Letters Patent, is—

The process of obtaining metallic zinc by the combination of the two metallurgic operations, substantially as herein specified.

ALFRED MONNIER.

Witnesses:
M. S. PARTRIDGE,
CHAS. A. FISHE.